Sept. 26, 1944.  S. L. LEIBOFF  2,359,128
APPARATUS FOR EXTRACTING CHOLESTEROL FROM BLOOD
Filed Feb. 20, 1941
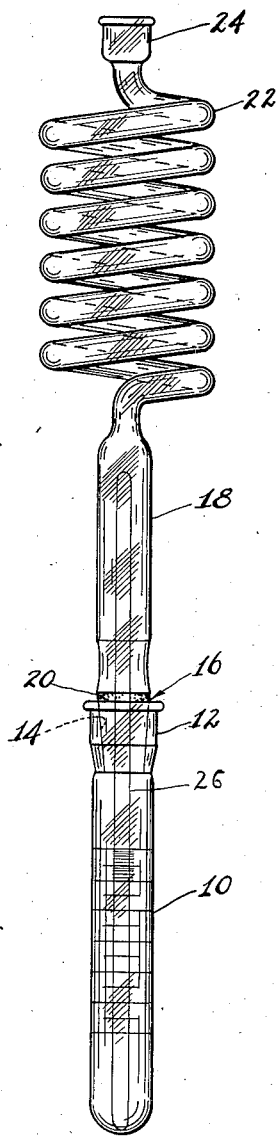
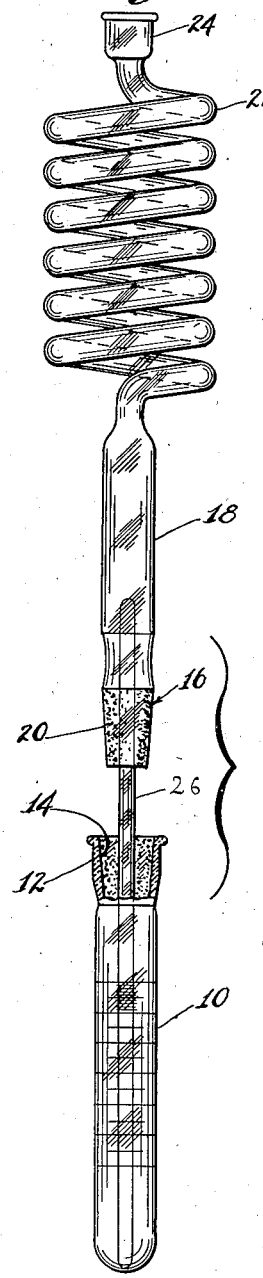
INVENTOR.
Samuel L. Leiboff
BY Harry Cohn
His attorney Patented Sept. 26, 1944

2,359,128

UNITED STATES PATENT OFFICE 2,359,128

APPARATUS FOR EXTRACTING CHOLESTEROL FROM BLOOD

Samuel L. Leiboff, Bronx, N. Y., assignor to Abraham M. Rosenfeld, doing business as Paragon C. & C. Co., New York, N. Y.

Application February 20, 1941, Serial No. 379,838

3 Claims. (Cl. 23—259)

This invention relates to apparatus for extracting cholesterol from blood.

Heretofore, in extracting cholesterol from blood directly by means of chloroform, it was considered necessary to thoroughly dry the blood before treating the same with chloroform for extracting the chloresterol. The drying operation involved, usually, absorbing the liquid blood in a porous absorbing medium and then heating the medium carrying the absorbed blood until all of the moisture was evaporated and the blood was completely dried. Thereafter, and only after the blood was thus completely dried, it was treated with chloroform for extracting the cholesterol therefrom. As the drying operation required considerable time, the extraction process was accordingly time consuming and was further objectionable because, among other things, the use of drying apparatus was required.

I have discovered that cholesterol can be extracted from blood directly by chloroform without drying the blood before treating the same with chloroform, thus eliminating the disadvantages, and objections described above and providing a highly effective method which can be quickly and easily performed. The provision of apparatus which is well adapted for use in performing this method constitutes one of the objects of the present invention.

The above and other objects of the invention and the preferred manner of practicing the same will more fully appear from the following description considered with reference to the accompanying drawing.

In the drawing:

Fig. 1 is a view of the extraction apparatus embodying the present invention;

Fig. 2 is a view of the several parts of the apparatus in detached relation.

Referring first to the method of the present invention, I take a quantity of the liquid blood from which the cholesterol is to be extracted and add thereto in a test tube or other suitable vessel a dehydrating agent, preferably anhydrous sodium sulphate, and a suitable quantity of chloroform. These substances are all mixed together in said tube and heated at the boiling temperature of the chloroform. After an interval of heating, say ten minutes, the mixture is again stirred, after which said heating is resumed. The mixture is then allowed to cool to room temperature and enough chloroform is added to replace any chloroform which might have become lost. Then the mixture is filtered, the filtrate containing the cholesterol in the chloroform. Said filtrate can then be used for the cholesterol determination in accordance with any of the several known and approved methods.

As an example of the above described method, 1.5$^{cc.}$ of blood are mixed at room temperature with 6 grams of anhydrous sodium sulphate and 15$^{cc.}$ of chloroform and thoroughly stirred in a test tube. The mixture is then boiled for about ten minutes, then stirred, and then boiled for about ten minutes more. The mixture is then cooled to room temperature, the volume observed and if less than the original volume at room temperature, sufficient chloroform is added to restore the original volume of the mixture at the room temperature thereof. Then the mixture is filtered and the procedure is continued as described above for the cholesterol determination. While I have referred to sodium sulphate as the preferred dehydrating agent, any other dehydrating agent can be used instead, for example anhydrous copper sulphate, anhydrous calcium chloride, etc.

The apparatus provided pursuant to the present invention for practicing the above described method will now be described. Said apparatus is preferably made of transparent glass and comprises, as here shown, a test tube or other suitable vessel 10 provided at its upper end with a flaring mouth 12 having a ground inner surface 14 adapted to be engaged by the tapered end 16 of a tube 18, said tapered end having a ground outer surface 20 which provides a fluid tight joint with surface 14. The test tube is provided with scale markings for reference in observing the volume of the mixture therein. Thus, before the mixture is heated, a reading of the scale of test tube 10 is taken at room temperature and after the heating a second reading is taken at room temperature, and if less than the first reading, chloroform is added to make up the difference in volume.

The upper end of tube 18 is integral with and in communication with the bore of an air cooled condenser 22 provided with an open end 24. Said condenser extends in helically coiled formation from the upper end of tube 18. It will be observed that the bore of tube 18 is substantially larger in diameter than the bore of the condenser tubing. This eliminates the accumulation of pressure in test tube 10 when the mixture is heated and thereby prevents the occurrence of violent movement of the mixture during heating thereof which might otherwise occur more especially because of the presence of solid matter in the mixture. It will be understood that as the mixture boils, the chloroform is vaporized and rises in the tubes 18 and 22 being thereby cooled and condensed and thus returned to the test tube 10. As tube 22 is integral with tube 18, these two tubes can be considered as a single tube having a lower portion and an integral upper portion formed into a helical condensing tube having a bore which is smaller than the bore of said lower portion.

A glass stirring rod 26 is provided for stirring the mixture as described above. Said stirring rod is long enough to project beyond the mouth of tube 10 and as shown extends into tube 18. The bore of test tube 10 and tube 18 are of such length that the stirring rod can be enclosed in the assembly and can extend substantially above the test tube into the bore of tube 18 which as above described is the lower portion of the single tube which includes the integral upper portion or condenser tube 22. Stirring rod 26 is kept in place in the apparatus throughout the operation, including the heating of the mixture, and access to said rod for the intermediate mixing operation is obtained by temporarily removing tube 18 and condenser 22 carried thereby.

While I have disclosed the preferred apparatus of the present invention, it will be understood that variations in the apparatus may be made without departing from the principles underlying said invention. Therefore I do not wish to be limited specifically to the apparatus as described or illustrated herein except to the extent which may be required by the scope of the appended claims.

Having thus described my invention, what I claim and desire to secure by Letters Patent is:

1. In apparatus for extracting cholesterol from blood and which comprises a vessel in which liquid blood and materials for treating the same are heated and which has a top opening, a tube having a lower end removably carried by said vessel and seated in said top opening thereof with a fluid-tight joint, and a helically coiled condenser tube carried by and integral with said first mentioned tube and extending upwardly in helical formation from the upper end of said first mentioned tube as a continuation thereof, said condenser tube having its lower or inlet end in communication with said first tube at said upper end thereof, the bore of said first mentioned tube being substantially larger than the bore of said condenser tube whereby to prevent the accumulation of pressure in said vessel when the contents thereof are heated, said vessel consisting of a test tube and the bore of said first mentioned tube being substantially the same as said test tube.

2. Apparatus for extracting cholesterol from blood comprising a test tube, and a second tube of substantially the same bore as said test tube seated in the upper end of said test tube and connected to said test tube by a fluid-tight joint, said second tube having a lower portion communicating with the bore of said test tube and forming a continuation thereof and having an upper integral portion formed into a helical condensing tube having a bore which is smaller than the bore of said lower portion.

3. Apparatus for extracting cholesterol from blood comprising a test tube, and a second tube of substantially the same bore as said test tube seated in the upper end of said test tube and connected to said test tube by a fluid-tight joint, said second tube having a lower portion communicating with the bore of said test tube and forming a continuation thereof and having an upper integral portion formed into a helical condensing tube having a bore which is smaller than the bore of said lower portion, the length of said test tube and the lower portion of said second tube being such that a stirring rod can be enclosed by the assembly and can extend substantially above the test tube into said lower portion of said second tube.

SAMUEL L. LEIBOFF.